US008085834B2

(12) United States Patent
Hanke et al.

(10) Patent No.: US 8,085,834 B2
(45) Date of Patent: Dec. 27, 2011

(54) SYSTEM PARTITIONING FOR MULTI-MOBILE DEVICES

(75) Inventors: Andre Hanke, Neubiberg (DE); Bernd Adler, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 910 days.

(21) Appl. No.: 12/112,596

(22) Filed: Apr. 30, 2008

(65) Prior Publication Data
US 2009/0274202 A1 Nov. 5, 2009

(51) Int. Cl.
H04B 1/38 (2006.01)
(52) U.S. Cl. .......................................... 375/220
(58) Field of Classification Search ................. 375/220
See application file for complete search history.

(56) References Cited

U.S. PATENT DOCUMENTS

| 7,089,033 | B2* | 8/2006 | Leinonen et al. | 455/553.1 |
|---|---|---|---|---|
| 7,158,574 | B2 | 1/2007 | Vishakhadatta et al. | |
| 2005/0079890 | A1* | 4/2005 | Yu | 455/557 |
| 2006/0084469 | A1* | 4/2006 | Malone et al. | 455/552.1 |
| 2007/0030116 | A1* | 2/2007 | Feher | 340/5.53 |

OTHER PUBLICATIONS

Silva, "Designing reconfigurable multi-standard analog baseband front end for 4G mobile terminals: system level design," Conftele, 2007, May 2007.*
Baschirotto, "Baseband analog front-end and digital back-end for reconfigurable multi-standard terminals," IEEE Circuits and Systems Magazine, Issue Date: First Quarter 2006 vol. 6 Issue:1 On pp. 8-28, ISSN: 1531-636X, Date of Current Version: Mar. 20, 2006.*
Nilsson, "Simultaneous multi-standard support in programmable baseband processors," IEEE 2006.*
Kuo, "A CMOS WLAN/GPRS dual-mode RF front-end receiver," Radio Frequency Integrated Circuits (RFIC) Symposium, 2004, Digest of Papers, 2004 IEEE, Publication Year: 2004, pp. 153-156.*
Xavier, "Cellular/WiFi multi-mode systems" 2006 IEEE Radio and Wireless Symposium, IEEE, Publication Year: 2006, pp. 3-6.*

* cited by examiner

*Primary Examiner* — Juan A Torres
(74) *Attorney, Agent, or Firm* — Eschweiler & Associates, LLC

(57) ABSTRACT

A communication device partition for multiple device data standards to be received on one baseband integrated circuit is described. At least two interfaces are partitioned according to the data rate speed of various types of data standards and coupled to a multimode software define radio (SDR) modem. A digital baseband processor is coupled to the multimode SDR modem and receives the various types of application data compliant with various data standards.

20 Claims, 5 Drawing Sheets

SYSTEM PARTITIONING FOR MULTI-MOBILE DEVICES

The present disclosure relates generally to communication systems, and more specifically to circuits and methods for partitioning different data standards onto a single baseband device.

BACKGROUND

Several trends presently exist with regards to wireless communication devices. For example, in comparison to previous generations of wireless devices, modern wireless devices are more compact, more affordable, and have longer battery lifetimes. Major changes are occurring within the wireless industry in regard to transceivers and how they interface with industry-standard products, such as GSM, UMTS, LTE, WiMax, WLAN, Bluetooth, GPS, DVB, WiBree and so on. For example, baseband products have historically used analog I and Q signals in commercial and proprietary digital cellular systems, although digital interfaces are emerging more as the standard.

Not only are digital interfaces bringing benefits, but changes in system partitioning are enabled by digital interfaces. This lowers cost and accelerates time-to-market. Digital signal processing (DSP) techniques are commonplace in many digital applications and are used within baseband processors also. By converting from RF to digital within the radio, DSP techniques can improve radio performance by supporting the implementation of FIR filters for anti-aliasing, antidroop, channel filtering, notch filter, digital modulation, etc.

Unlike analog basebands, purely digital basebands can take advantage of semiconductor process density improvements, which are achieved much more rapidly in digital technology compared to analog. For example, in highly integrated GSM transceivers the die area can be dominated by analog passive components. The area required for a given capacitance has been reduced over the years, but not like the doubling of density described by Moore's law for digital functions.

The latest mobile phones provide multiband and multi-mode operation on cellular networks. The number of communication pipes for Wi-Fi connections, digital TV, digital audio broadcast and GPS satellite reception, among other technologies continue to increase. In recent years, one way in which designers have tried to deliver compact and efficient chipsets is by including zero intermediate frequency (IF) receivers. A zero IF receiver enables direct conversion of analog radio frequency (FREQ) signals to a digital baseband. This typically reduces the component count, and may correspondingly limit the footprint and cost of the chipset. By reducing the number of components, zero IF receivers also simplify the supply chain and improve manufacturing yield.

While zero-IF receivers offer a more compact chipset, technical barriers often limit the extent to which such receivers can be used in modern communication systems. For example, because a local oscillator signal (LO) in these receivers is the same as the RF frequency, the LO signal may leak from the receiver to the antenna, which can cause interference with other receivers on the same frequency-band. Also, DC offset, which comes from the self-mixing of LO leakage, may seriously deteriorate the SNR (Signal Noise Ratio).

One type of receiver that limits both of these shortcomings (i.e., LO leakage and DC offset) is a low-IF receiver. In low-IF receivers, the received RF frequency is down-converted to a low, but non-zero IF, before being down-converted to the baseband. Thus, the down-conversion from the received RF frequency to the baseband will have one or more IFs, where each IF corresponds to a separate stage in the receiver. Due to the fact that these separate stages are relatively area intensive, conventional low-IF receivers have a relatively large footprint.

Convergence among mobile devices means that many combinations of these RF communication/broadcast standards will appear in PDA's, laptop computers and game consoles. In these products, space, cost and power consumption constraints will make it no longer viable to have a dedicated wireless transceiver for each standard. Therefore, there is a need for partitioning interfaces for these devices capable of handling various standards while also avoiding overhead in terms of cost and current on the platform.

SUMMARY

The following presents a simplified summary in order to provide a basic understanding of some aspects of the invention. This summary is not an extensive overview of the invention, and is neither intended to identify key or critical elements of the invention nor to delineate the scope of the invention. Rather, the purpose of the summary is to present some concepts in a simplified form as a prelude to the more detailed description of different embodiments presented later.

In one embodiment of the disclosure, a wireless device for communicating a digital baseband signal, comprises a digital baseband processor coupled to a modem, a plurality of digital interfaces partitioned to receive a respective one of a plurality of signals each associated with one of a plurality of different data standards comprising a first interface circuit configured to provide at least one application data compliant with one of a first set of different data standards coupled to the modem via a first common digital interface and a second interface circuit configured to provide at least one application data compliant with one of a second set of different data standards coupled to the modem via a second common digital interface. The first and second common digital interface each comprise a frame buffer configured to selectively receive at least one application data of the first set of different data standards or the second set of different data standards, respectively, as a function of a control signal, and to facilitate presentation of or transmit the at least one application data selectively received to the digital baseband processor via the respective first common digital interface or second common digital interface coupled to the modem.

In another embodiment of the disclosure, a method for communicating with a digital baseband processor over a plurality of digital interfaces, comprises receiving application data compliant with one of a first set of different data standards on a digital baseband processor coupled to an software defined radio (SDR) modem via a first common digital interface, selecting a first application data compliant with a second data standard of the first set and presenting at a first time the first application data compliant with the first set to the digital baseband processor over receive data pins of the fist common digital interface, and selecting a second application data compliant with a second data standard of the first set and presenting at a second time the second application data to the digital baseband processor over the receive data pins of the first common interface. The method further comprises receiving application data compliant with one of a second set of different data standards on a digital baseband processor coupled to a SDR modem via a second common digital interface, selecting a first application data compliant with a first data standard of the second set and presenting at a first time the first application data compliant with the second set to the digital baseband processor over receive data pins of the second common digital interface, and selecting a second application data compliant with a second data standard of the second set and presenting at a second time the second application data to the digital baseband processor over the receive data pins of the second common digital interface. Each data standard of the first set of different data standards is a faster data rate than the second set of different data standards and the first common digital interface provides data rate signals that are faster than the second common digital interface.

The following description and annexed drawings set forth in detail certain illustrative aspects and implementations of diverse embodiments. These are indicative of but a few of the various ways in which the principles of the invention may be employed.

DETAILED DESCRIPTION

The present disclosure will now be described with respect to the accompanying drawings in which like numbered elements represent like parts. The figures and the accompanying description of the figures are provided for illustrative purposes and do not limit the scope of the claims in any way.

Figure 1:
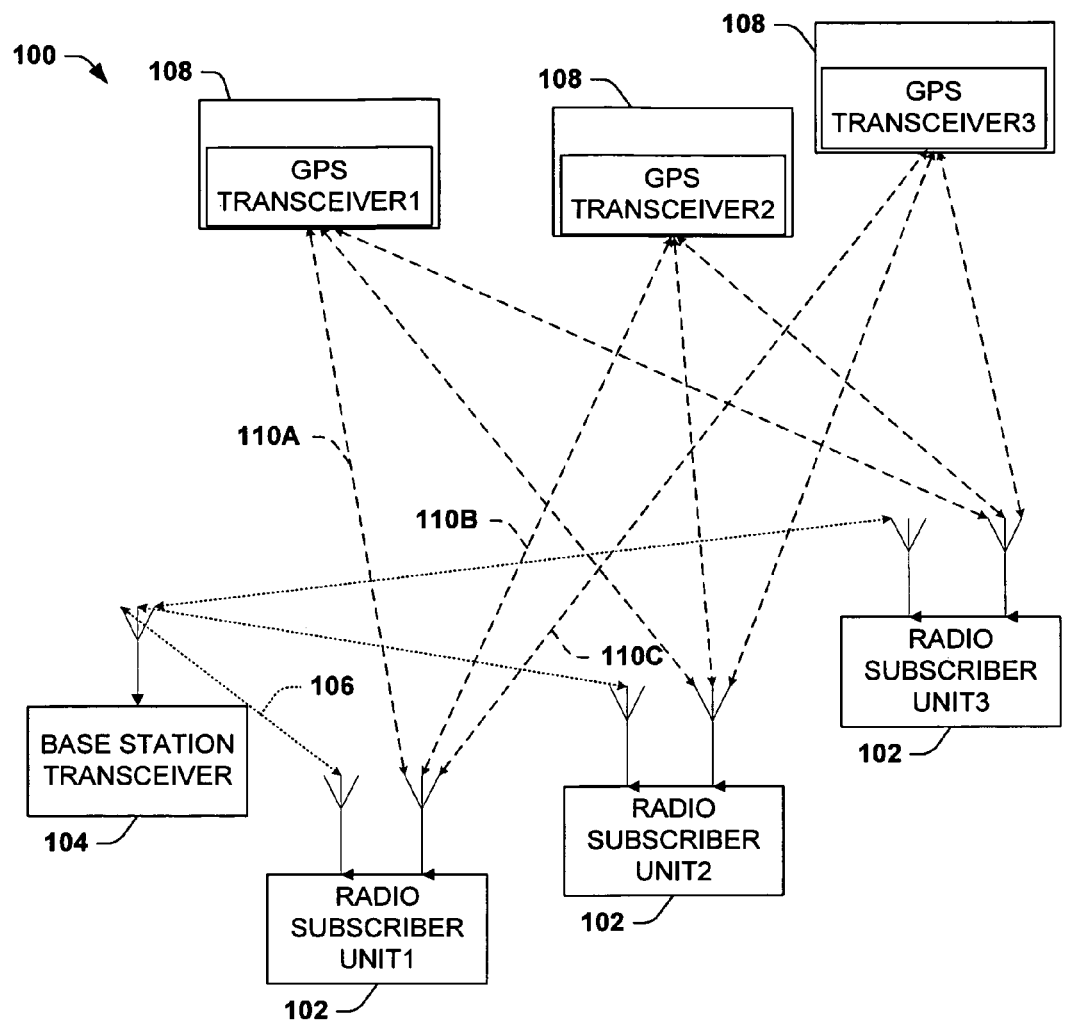
FIG. 1 is a block diagram of one embodiment of a communication system.

FIG. 1 shows a communication system 100 that includes a number of radio subscriber units 102. In one embodiment, each radio subscriber unit 102 could be a cellular phone, although other radio subscriber units could be pagers, personal digital assistants (PDAs), etc. For purposes of illustration, several types of application data are now discussed below with reference to FIG. 1. It will be appreciated, however, that these types of application data are only included for purposes of illustration and that aspects of the disclosure are applicable to any type of application data. After this brief discussion, a more detailed discussion of a communication device that can integrate several types of application data is discussed with reference to FIGS. 3-4.

Referring now to FIG. 1, one can see a communication system with a number of radio subscriber units 102 that could each include several transceivers for providing access to several different types of application data. Because the different types of application data could often be communicated over different frequency ranges (or have other distinguishing characteristics), each transceiver could be specifically configured to provide access to a different type of application data.

One type of application data that a radio subscriber unit 102 could use is cellular data. The radio subscriber unit 102 could include a cellular transceiver configured to exchange this cellular data with a cellular base station transceiver 104. For example, RadioSubscriberUnit1 is shown exchanging cellular signals 106 with the base station. Depending on the implementation, these cellular signals could be structured in accordance with code-division multiple access (CDMA) or time-division multiple access (TMDA) schemes, for example. In one embodiment, the cellular signals could be structured in accordance with Global System for Mobile Communications (GSM) or Universal Mobile Telecommunication System (UMTS) standards, but in other embodiments could be used in accordance with other standards.

In addition to exchanging cellular signals, the radio subscriber units 102 could also include a global positioning system (GPS) transceiver to receive GPS data from several satellites 108. Thus, RadioSubscriberUnit1 is shown receiving GPS data signals 110A, 110B, 110C from three satellites' transceivers (GPSTransceiver1, GPSTransceiver2, GPSTransceiver3, respectively). Assuming RadioSubscriberUnit1 can connect with a sufficient number of satellites, the unit should be able to use the GPS data to determine the unit's precise latitude and longitude on the surface of the earth.

To mitigate the effects of multi-path, the radio subscriber units 102 may also include a diversity receiver that develops information from several signals transmitted over independent fading paths. Often, such a diversity receiver includes at least two antennas and employs a diversity scheme to mitigate multi-path effects. Illustrative diversity receivers could use one of several types of diversity schemes, including but not limited to: space diversity, polarization diversity, angle diversity, frequency diversity, and/or time diversity.

In one embodiment, separate receivers could be used for each type of application data (e.g., a cellular transceiver for cellular data, a GPS receiver for GPS data, a diversity receiver for diversity data, etc.). In such an embodiment, however, several challenges arise from trying to integrate the receivers associated with these applications into a single communication device. For example, because these receivers often interface to a single baseband integrated circuit, the addition of multiple receivers leads to complex interfaces between various circuits within the communication device. This ultimately leads to higher costs for the communication devices.

The simplest digital interfaces used in mobile systems are low frequency pure digital pads, means rail-to-rail single-ended outputs, like an inverter output or an inverter input. At high frequencies problems arise with utilizing such low frequency interfaces for increasing clock rate at the interface. Spurious emissions caused by going to higher clock rates limit the slope of the interface and thus the speed or level of the interface. Normally digital interfaces are limited to speeds of up to 104 MHz, due to power and emissions. Digital interfaces at higher speeds or fast data rates are more complex because more blocks are required to achieve a high speed interface frequency, but are designed to meet a certain performance in power and emissions. For instance, a DigRFv3.09 interface runs on 312 MHz frequency with a swing of 150 mV, or a DigRF 3G series may be utilized.

Figure 2:
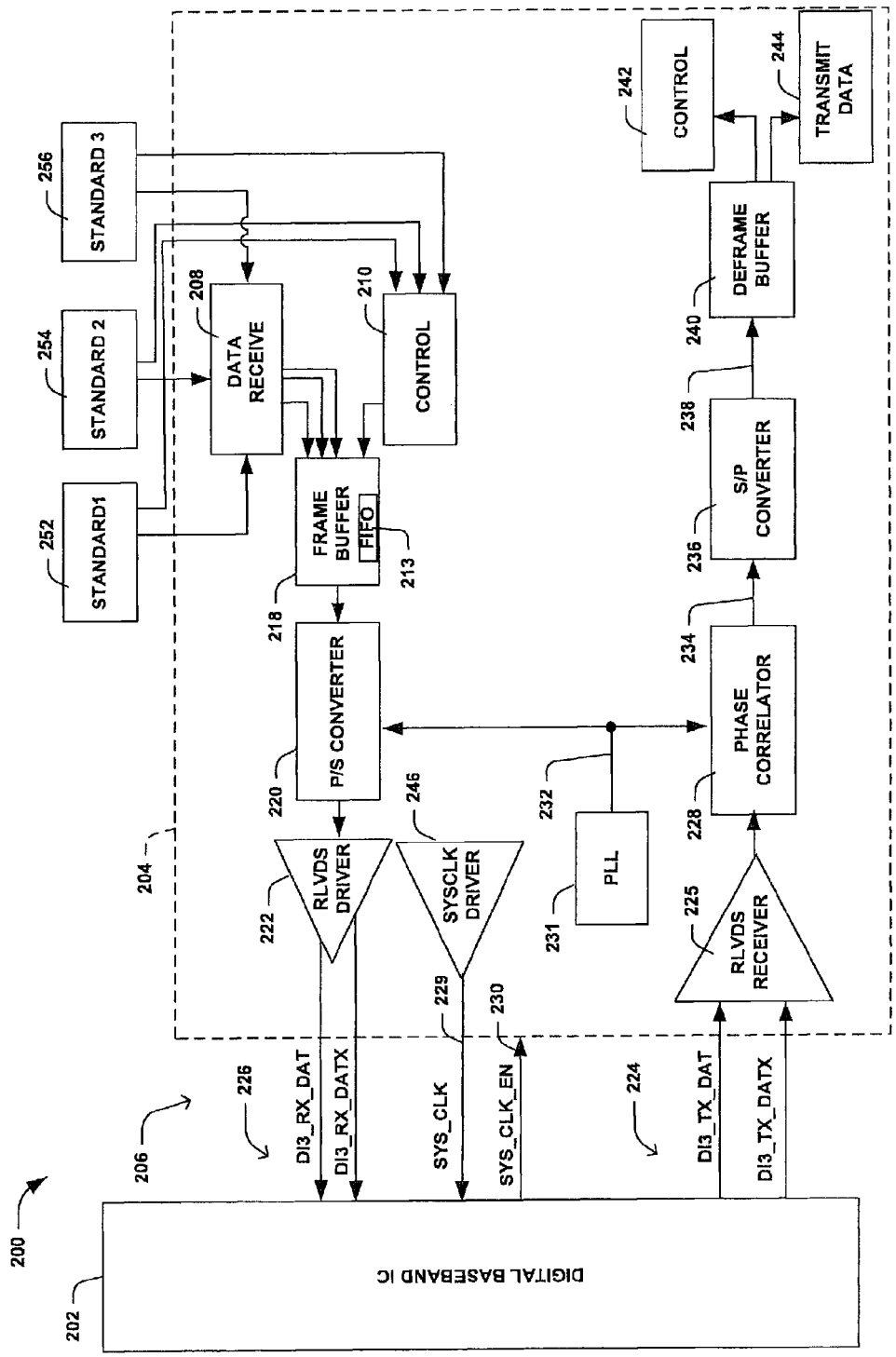
FIG. 2 is a block diagram of one embodiment of a communication device, such as a radio subscriber unit.

FIG. 2 illustrates an example of a digital interface circuit with a communication device 200 that can effectively integrate a plurality of signals each associated a plurality of different data standards in a plurality of sets of different data standards. Standard 1, Standard 2, and Standard 3, 252, 254, and 256, respectively, may each for example comprise a set of different data standards. In one embodiment, the communication device 200 could be a radio subscriber unit (e.g., radio subscriber unit 102), but in other embodiments it could be some other communication device. The communication device 200 includes a digital baseband integrated circuit (IC) 202 that is coupled to an interface circuit, such as a radio frequency circuit 204 via a common digital interface 206. In one embodiment the common digital interface 206 of FIG. 2 could be a DigRFv3.9, for example. This interface for example can run on 312 MHZ frequency with a swing of 150 mV and is digital.

The radio frequency (RF) circuit 204 may include several different receivers (not shown), each of which may be used to communicate a different type of application data wherein data is received at a data receive 208 box and transmitted at a data transmit 244. Any receivers are configured to receive data for the RF circuit at the data receive 208 and may be part of respective transceivers, which are configured to both receive and transmit data 244. In FIG. 2's illustrated embodiment, the radio frequency circuit 204 includes a data receive path 208 which can provide an application data type of a particular standard from various receivers (not shown) compliant with a various standards of a set of standards 252, 254, or 256. The standards can be any type of standard that can be partitioned for receiving signals from the RF circuit 204 to be received at the baseband processor 202 via a common interface 206. For example, the present disclosure embodies a partitioning according to those standards within a similar data rate speed. For example, the data path 208 could be used to receive cellular data for the operation of a cellular engine. Alternatively, the data receive path 208 could be used to receive diversity data for data of a cellular engine, or any other type of data standard configured by the control 210 to be received.

The data receive 208 is coupled to a frame buffer 218, which selectively receives at least one application data compliant with one of a first set of different data standards via a selected path as a function of a control signal of a control box 210. This control signal (which could control a switching element, such as a multiplexor, switch, etc.) could be based on whether data has been received at the first or second receiver (not shown) providing data through the data receive 208 pathway. If one type of application data is received exclusively at one receiver, the selected data could be one of the first set of data standards. By contrast, if data is received exclusively at another receiver, the selected data could be compliant with a second of the first set of data standards. Any number of sets of data standards may be embodied and received according to a number of various means/criteria. For example, if data is received at both the first and second receivers, the selected data could be based on a priority assigned to the first and second receivers. This priority can be based, for example, on the bandwidths associated with the first and second application data, quality of service (QoS) requirements for the first and second application data, or other considerations.

Any number of sets of application data could be embodied. For example, sets of application data or sets of data standards can be classified according to a number of various means. A set of application data in one embodiment comprises a set of data types or data standards that are similar to one another by data rate speed. As one example, a first set of data standards or of application data can comprise high data rate speeds, such as Global Positioning System data (GPS), WLAN, WiMaxx, LTE, or even DVB data standards, for example, wherein the high data rate speeds are of a higher data rate than any other set of standards of a plurality of different data standards. By way of another example, a second set of data standards or of application data can comprise data rate standards that neither have high data rates or low data rates, but instead comprise a medium data rate standard, such as cellular data or diversity data for example. In a further example, a third set of application data may comprise standards of low data rate speeds, such as Bluetooth or FM audio, or other low data rate standards that are lower than any of the other sets of data standards. The third set of data standards may be audio standards or digital standards. The first set of data of data standards or the second set of data standards may comprise a single standard as well.

Consequently, many different data standards like GSM, UMTS, LTE, WiMax, Bluetooth, GPS, DVB, WiBree and so on are all in use on one phone. The main difference between the standards for an interface is the huge difference in data rate of these standards. Therefore, digital interfaces receiving many different standards can be partitioned to receive a particular set of application data such as the first set, second set, or third set, for example. A set may comprise either one type of data standards or a plurality of different data standards.

The frame buffer 218 could include several FIFOs 213 or other memory elements for receiving the various types of application data compliant with one of a set of data standards. In one embodiment, one FIFO 213 could be associated with the selected data and another FIFO 213 could be associated with the third application data. Thus, the frame buffer 218 can manage the FIFOs to determine when a given type of application data of a set of application data should be transmitted in packet format across the common interface 206 to the baseband IC 202. In other embodiments, separate FIFOs could be associated with each different receiver corresponding to a particular signal associated with a particular data standard.

Depending on the implementation, a parallel to serial converter 220 may be used in conjunction with an output driver 222 to present the application data over the common interface 206 to the baseband IC 202. In some embodiments, the data transmitted across the common interface 206 may include header information that allows the base band IC 202 to distinguish between the various types of application data.

In the illustrated embodiment, the common digital interface 206 of the baseband IC includes transmit pins 224, receive pins 226, a system clock pin 229 of a system clock driver 246, and a system clock enable pin 230. The system clock enable pin 230 may be used to aid low-power considerations. These pins could be coupled to corresponding pins on the radio frequency circuit 204 to allow signals to pass between the baseband IC 202 and the radio frequency circuit 204. Depending on the implementation, application data could be communicated in parallel or in serial over the transmit pins and receive pins 224, 226.

To transmit various types of application data, the radio frequency circuit 204 may receive data from the baseband IC 202 over the transmit pins 224 and ultimately present this data to one or more transmitters (not shown). The transmitters may be integrated into the receivers (i.e., may be transceivers that can bi-directionally communicate data), or may be standalone transmitters.

After the radio frequency circuit 204 receives the data to be transmitted from the baseband IC 202, the data may pass through an input driver 225 to a phase correlator 228. The phase correlator 228 may work in conjunction with the phase-locked loop (PLL) 231 to ensure that the received data and transmitted data are suitably in-phase with one another. The PLL 231 provides a reference signal 232 that is locked to the phase of the input clock signal or to the phase of a suitable received data signal. The phase correlator 228 uses this reference signal to provide retimed data 234 to be transmitted.

After the re-timed data 234 leaves the phase correlator, it may be processed by a serial to parallel converter 236. Lastly, the re-timed data 238 may be processed by a deframe buffer 240 that sends the various application data signals to the proper transmit data 244 pathway in conjunction with the control 242.

In some embodiments, the first and second receivers may share circuit elements. For example, in an embodiment where the first receiver is a diversity receiver and the second receiver is a GPS receiver, the receivers may share one or more components. For example, typical blocks that may be reused in such receiver devices are a mixer which may be fed by different low noise amplifiers (LNA's) for different standards, a baseband filter may be switched in between different modes and thus can be also reused, as well as analog-to-digital conversters (ADCs) for the received signal and the digital signal processing path.

In various embodiments, some components within the radio frequency circuit may be formed in a single integrated circuit. In one embodiment, the entire radio frequency circuit may be formed within a single integrated circuit. This integrated radio frequency circuit can be manufactured at a significant cost savings compared to other solutions where the components are formed on separate integrated circuits and then coupled together on a circuit board.

Digital modulators naturally interconnect with baseband processors using digital interfaces. For example, transceivers using fractional-N synthesizer-based digital Gaussian Minimum Shift Keying (GMSK) modulators benefit if the baseband's GMSK bit stream is available to the transceiver. When analog-to-digital conversion occurs in the radio, the baseband system can be partitioned to exclude all analog functions, which can then be placed in a separate mixed-signal device. This mixed-signal device could include all the power management unit device functions, audio codec functions plus any auxiliary data converters. By removing all analog functions from the baseband, new technologies can be implemented more easily. The porting of digital designs to new technologies can be made possible with the push of a button.

Convergence among mobile devices means that many combinations of these RF communication/broadcast standards will also appear in PDAs, laptop computers and game consoles. In these consumer products, space, cost and power consumption constraints will make it no longer viable to have a dedicated wireless transceiver for each standard. Software Defined Radio (SDR), implemented using an advanced programmable digital signal processor (DSP), such as an embedded-vector processor (EVP), holds the solution: a single module block capable of handling all these standards.

One reason dedicated wireless transceiver modules such as Bluetooth and Wi-Fi have attained market success is that these communications modules were mostly add-on options, not standard features. Therefore, solutions that allow manufacturers to configure an otherwise standard chassis simply by plugging in the appropriate modules, including the necessary RF and baseband processing, offer obvious benefits. As combinations of these wireless communication channels become standard in equipment, however, the continued use of such dedicated modules becomes problematic. Not only will the aggregate size of the required modules become difficult to accommodate, but the total power consumption will threaten battery life, and the increased silicon area will adversely impact production cost. Moreover, in situations where several communications channels must be active at the same time, the modules' coexistence becomes a problem because of the number of mutually interfering antennas required.

Reducing size, cost, power consumption and antenna interference suggests the use of an architecture in which all or part of the RF and baseband functionality is shared by different RF communication channels. For example, in an integrated solution, channels operating in the same frequency band, such as Bluetooth and IEEE 802.11b/g, could intelligently share RF hardware such as an antenna, a low-noise amplifier and a mixer. Likewise, channels that utilize similar modulation schemes could share a single programmable modem. This will lead to new multiband, multimode architectures in which RF is integrated with RF and modem with modem, preferably with standardized digital interfaces in between. To enable a single hardware modem to service several different wireless communications channels, highly flexible, software-programmable modem engines are needed.

In practice, modem engines represent one of the best areas for manufacturers to differentiate themselves in the marketplace because of the opportunity they provide for enhancing wireless performance. The air interface for any mobile communications standard is rigidly defined, limiting manufacturers' ability to enhance RF front-end performance other than by choosing the best technology for implementing it (for example, using an RF CMOS, BiCMOS or GaAs process technology as appropriate). The codec at the other end of the modem pipe is also well defined in terms of the type of algorithm required for its implementation.

The modem sitting between the RF front end and the codec, however, is an area in which devices can be used to process and condition the modulated/demodulated signal before it enters the codec, achieving a lower bit error rate (BER) or a reduction in transmit/receive power for a given BER. Because this signal processing and conditioning must be adaptive to local conditions, such as multipath fading and interference, it should ideally be performed by DSP algorithms executed on a high-end software-programmable DSP. Such a programmable approach enables adaptation to changing standards and field test results. It also allows the addition of new, smarter algorithms (for example, to improve signal/noise ratio), something difficult to do afterward, in hardware-based solutions, without a silicon respin.

Because of the complexity of these algorithms, the processors used in modem pipe applications must be capable of superior performance, typically in excess of 10 Giga-operations per second (Gops). However, the battery-powered, mobile nature of the devices for which they are designed also means that they must consume very little power (typically no more than a few hundred milliwatts). Using advanced low-power/low-leakage CMOS fabrication technology, this limits the processors' clock speeds to 300 MHz. To achieve the required Gops ratings at these clock speeds, the processors must exploit a very high level of parallelism (for example, by performing vector-wide processing).

Algorithms that can be vectorized to run on vector processors include those for signal conditioning functions such as equalization, interference cancellation and multipath correlation (rake receiver), and for signal processing functions such as synchronization, quadrature amplitude modulation (QAM) mapping/demapping and fast Fourier transforms (FFTs) for Orthogonal frequency-division multiplexing (OFDM) demodulation.

There are, of course, other advantages to software programmability. A single, freely available silicon platform may be used, and it enables future shifts to newer, more advanced algorithms. DSP-based modems are also much more flexible when it comes to upgrading modem performance or adding features during the design-in process.

Hardwired building blocks are currently used in handsets having to implement only a relatively small number of (fixed) standards. While they are cost-effective in such limited applications, their required area increases rapidly with the number of standards. For example, a solution capable of handling Enhanced Data Rates for GSM Evolution (Edge), R'99, High-Speed Downlink Packet Access (HSDPA) and High-Speed Uplink Packet Access (HSUPA) standards in a single device using the dedicated-block approach required an area 50 percent to 120 percent larger than a programmable solution. The main reason is that standards have significant differences, and the engineering time required to implement effective resource sharing among standards in a hardware solution is high for optimization to this level. Programmable solutions also allow the addition of new, smarter algorithms without requiring a new tapeout, as well enabling adaptation to changing standards and field test results.

Another solution is the use of programmable/reconfigurable hardware, such as FPGAs (a typical approach for 3G basestations). Although resource reuse levels can be even higher here than with a programmable solution, current FPGAs are still relatively expensive with respect to silicon area, because the effective gate area is significantly lower compared with a fixed implementation (either dedicated hardware or a programmable architecture). Also, the larger area has a direct impact on a phone's standby time, which means leakage current may be an issue. Thus, from an area/cost perspective, a programmable architecture is a solution. Power consumption is slightly higher for a programmable architecture than for a hardwired solution, but from a larger, system perspective this trade-off is acceptable, since the added power draw can be compensated for elsewhere. For example, a reduction in standby power is detected because the programmable approach allowed implementation of smarter algorithms to reduce active time during standby periods.

Figure 3:
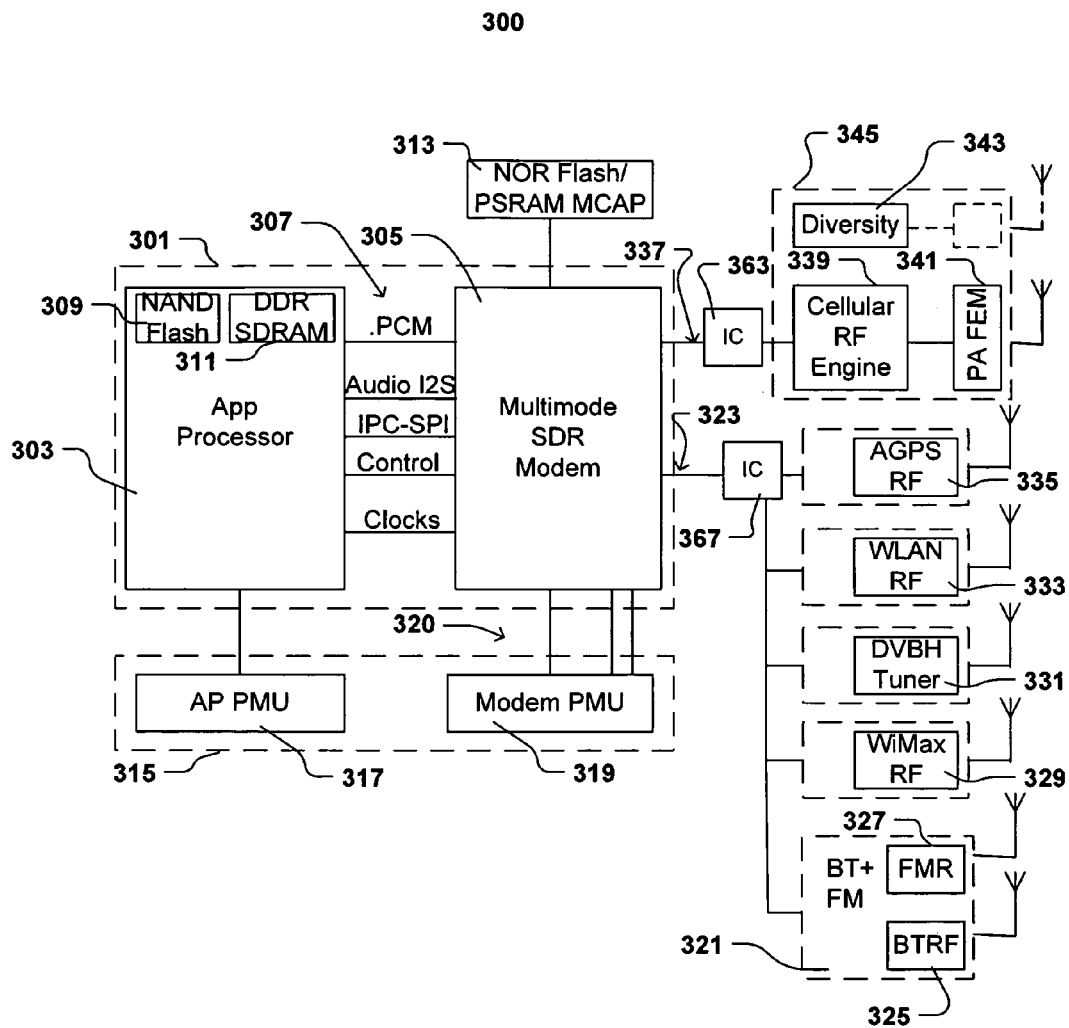
FIG. 3 is a block diagram of one embodiment of a communication device with digital interfaces partitioned.

FIG. 3 illustrates an example of a partitioning of digital interfaces 337 and 323 with a communication device 300 that can effectively integrate several types of application data. In one embodiment the communication device could be a radio subscriber unit (e.g., radio subscriber unit 102), but in other embodiments it could be some other communication device. The communication device 300 includes a digital baseband integrated circuit (IC) 301 that is coupled to a radio frequency circuit 345 via a first common digital interface 337, wherein a first interface circuit 363 is coupled therebetween. The communication device 300 comprises an application processor 303 coupled to a multimode SDR modem 305 via a common interface 307 that comprises pin connections for clocking, pulse code modulated signals, audio via I2C connect pins, other control pins, and IPC-SPI pins, for example. In addition, the SDR modem may be coupled to a memory 313, such as a NOR Flash, or PSRAM with an MCAP or modularly configured attached for processor. The application processor 303 may also comprise a non-volatile memory 309 and/or a volatile memory 311, such as a NAND flash memory 309 and/or a DDR SDRAM memory 311, for example.

In implementing the SDR modem 305, a "vector processor" is possible as an extension to the classical Single instruction, multiple data (SIMD) type of processing. Adding "intra-vector processing" provides the capability for interaction among elements within a vector. That allows, for example, arbitrary reordering of data within a vector as needed for FFT butterflies, pilot channel removal and other computations common in communications signal processing. This significantly increases computational efficiency compared with pure SIMD, where in such cases a fallback to sequential processing is often the only solution available. Because of their ability to implement highly adaptive modem functions for many different communications standards and to negotiate a smooth hand- over from one standard to another, programmable EVPs are a key enabler for software-defined radio. In addition to meeting the very high Gops condition, such processors meet the silicon area and cost requirements of battery-powered, portable products. Their very high level of programmability not only accommodates the multiplicity of wireless communications systems appearing in mobile devices but also allows manufacturers to keep pace with the evolution and usage scenarios of these standards as well as the development of new algorithms. They will also enable manufacturers to repair or upgrade their products "over the air" and thus reduce field returns or enhance user experience through the provision of wider coverage or higher bit rates for data download. Codecs, for example, involve functions such as Viterbi and Turbo coding/ decoding, which would consume significant processing resources on a software-programmable codec engine, especially at the high bit rates involved (typically in excess of 100 Mbits/s). However, these functions do not really require software programmability because the variations between standards are minor. It therefore makes more sense to hardware-accelerate these functions using a reconfigurable codec solution than to implement them in a software-programmable one. The same is true for channel filtering. SDR can be a mix of programmability and software-controlled reconfigurability in the RF front end in which embedded microcontrollers, digital signal processors, vector processors and hardware accelerators all play their parts.

With the shift of analog-to-digital and digital-to-analog conversion up to the intermediate-frequency stage, SDR can also influence the partitioning of multimode, multichannel RF transceivers. Channel-filtering, modem and codec functionality is likely either to move into the host's baseband chip or to be aggregated into a separate connectivity modem engine. This not only will reduce the chip count but will also allow modem and baseband functionality to migrate quickly from one CMOS process technology to the next, enabling rapid cost reduction. At the same time, RF front ends and power amplifiers can continue to be implemented in the technology that provides the proper performance.

In another embodiment, the application processor 303 is coupled to an application power management unit (PMU) 317 or power management device comprised by a PMU 315 comprising both the application PMU 317 and a modem PMU 319 coupled to the multimode SDR modem 305 via a common interface 320. The PMU 315 can be a microcontroller that governs power functions for the application processor via the application PMU 317 and also for the mulimode SDR modem 305 via the modem PMU 319. The microchips can have similar components to your average computer, including firmware and software, memory, a CPU, input/output functions, timers to measure intervals of time, as well as digital to analog converters to measure the voltages of the main battery or power source of the computer. The PMU 315 is one of the few items to remain active even when the device is shut down, powered by a backup battery. For the wireless device 300 the PMU 315 can be responsible for coordinating many functions, including: monitoring power connections and battery charges; charging batteries when necessary; controlling power to other integrated circuits; shutting down unnecessary system components when they are left idle; controlling sleep and power functions (on and off); managing the interface for built in keypad and trackpads on portable computers; and regulating the Real-Time Clock, for example. The PMU 315 can control power-consuming functions. It can constantly run diagnostics on the various power-related operations and checking them against the current Energy-Saver settings, allowing the PMU to actively manage power consumption for optimum user performance.

FIG. 3 illustrates one embodiment of a partitioning of digital interfaces, such as with the first common digital interface 337 coupled to the first interface circuit 363 and a second common digital interface 323 coupled to a second interface circuit 367. The communication device 300 can effectively integrate a plurality of signals each associated with one of a plurality of different data standards. The plurality of digital interfaces, 337, and 326 can be partitioned to receive one of a plurality of signals respectively associated a plurality of data standards. The first interface circuit 363 can be configured to provide at least one application data that is compliant with one of a first set of data standards, and coupled to the SDR modem 305 via the first common digital interface 337. The second interface circuit 367 can be configured to provide at least one application data compliant with one of a second set of data standards coupled to the SDR modem 305 via the second common digital interface 323. The second set of data standards or the first set of data standards can comprise a plurality of different data standards. A set may comprise either one type of data standard or a plurality of different data standards.

The first interface circuit 363 and the second interface circuit 367 each comprise a frame buffer (not shown) configured to selectively receive at least one application data of the first set of data standards or the second set of data standards, respectively, depending on a control signal, and to transmit the at least one application data selectively received to a digital baseband processor 301 via the first common digital interface 337 or second common digital interface 323, respectively, via to the modem 305.

The communication device 300 includes the digital baseband integrated circuit (IC) 301 that is coupled to radio frequency circuit 345 via the common digital interface 337. In one embodiment, the common digital interface 337 of FIG. 3 could be a DigRFv3.9, for example. This interface for example can run on 312 MHZ frequency with a swing of 150 mV. The common digital interface 323 can be a DigRF4G series, for example, or any other real digital high speed interface for interfacing signals compliant with a set of data standards of a data rate speed faster than the common digital interface 337 allocated for intermediate or mid-level data rate standards, such as for a cellular RF engine 339 and/or a diversity receiver 343 capable of analyzing signals from multiple pathways.

In one embodiment of the disclosure the radio frequency (RF) circuit 345 and/or 321 may include several different receivers such as 343 and/or 339 and a frequency modulated receiver (FMR) receiver 327 and/or Bluetooth receiver (BTRF) 325, respectively, each of which may be used to communicate a different type of application data compliant with various data standards. The data standards can be any type of standard that can be partitioned for receiving for the particular RF circuit to be received at the baseband processor 301 via a common digital interface 323 or 337. For example, the present disclosure embodies a partitioning according to those standards within a similar data rate speed. For example, the common digital interface 323 could be used to receive cellular data for the operation of a cellular engine 339 coupled to a front end module or PA FEM 341.

A control signal (which could control a switching element, such as a multiplexor, switch, etc.) could be based on whether data has been received at the first or second receiver (not shown) providing data through to the common digital interface, such as 323. If one type of application data is received exclusively at one receiver, the selected data could be one of the first set of data standards. By contrast, if data is received exclusively at another receiver, the selected data could be compliant with a second of the first set of data standards. Any number of sets of data standards may be embodied and received according to a number of various means/criteria. For example, if data is received at both the first and second receivers, the selected data could be based on a priority assigned to the first and second receivers. This priority can be based, for example, on the bandwidths associated with the first and second application data, quality of service (QoS) requirements for the first and second application data, or other considerations.

Any number of sets of application data could be embodied. For example, sets of application data can be classified according to a number of various means. A set of application data in one embodiment comprises a set of data types or data standards that are similar to one another by data rate speed. As one example, a first set of data standards provided to the Baseband via the common digital interface 323 can comprise high data rate speeds through various receivers, such as a AGPS RF 335, a WLAN RF 333, a DVBH Tuner 331, a WiMaxx RF 329, and/or a LTE receiver for example, wherein the high data rate speeds are of a higher data rate than any other set of standards of a plurality of sets of different data standards. By way of another example, a second set of application data can comprise data rate standards that neither have high data rates or low data rates, but instead comprise a medium data rate standard, such as cellular data or diversity data for example via the common digital interface 337. This interface 337 may be a dedicated interface or shared. In a further example, a third set of data standards may comprise application data for standards of low data rate speeds, such as Bluetooth or FM audio, or other low data rate standards that are lower than any of the other sets of data standards.

Consequently, many different data standards like GSM, UMTS, LTE, WiMax, Bluetooth, GPS, DVB, WiBree and so on are all in use on one phone. The main difference between the standards for an interface is the huge difference in data rate of these standards. Therefore, digital interfaces receiving many different standards are partitioned to receive a particular set of application data, such as the first set, second set, or third set, for example, as discussed above.

Figure 4:
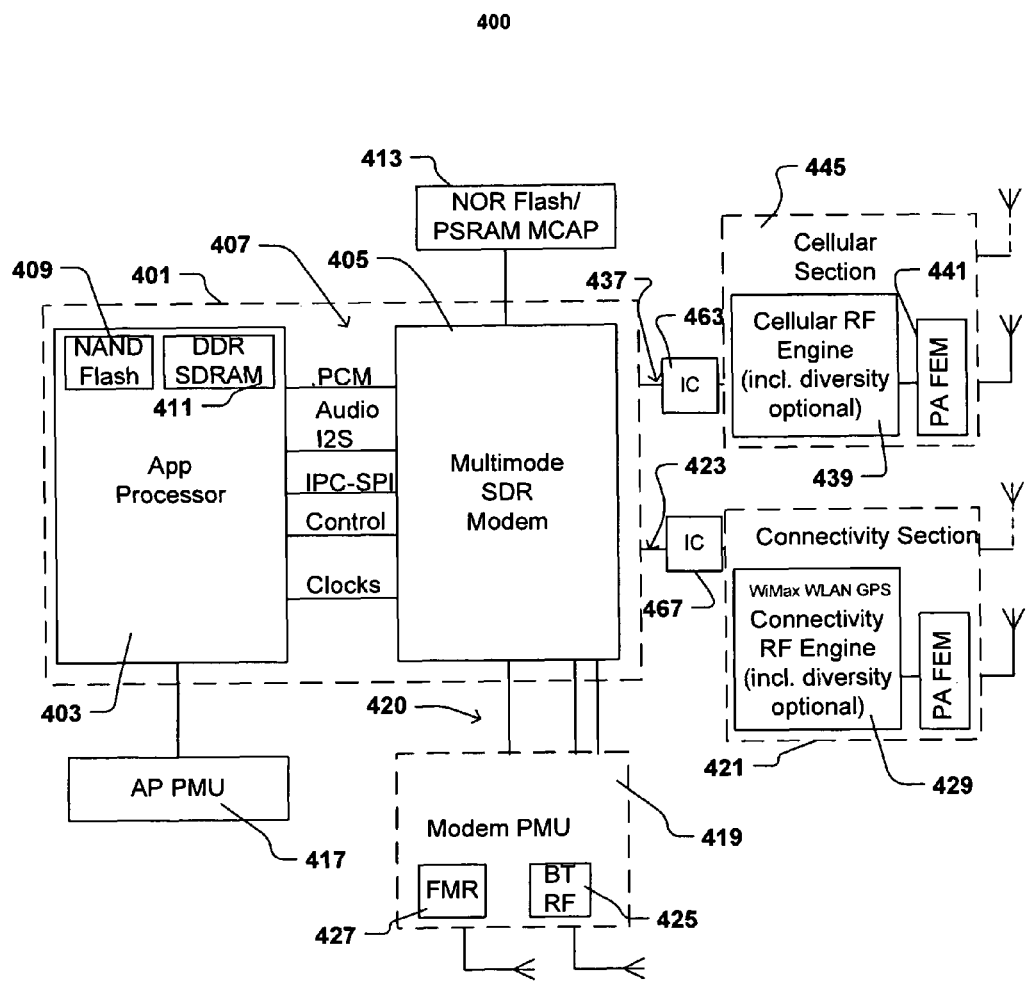
FIG. 4 is a block diagram of one embodiment of a communication device with digital interfaces partitioned.

FIG. 4 illustrates one embodiment of a partitioning of various common digital interfaces 437 and 423 coupled to an interface circuit 463, and/or 467, respectively, with a communication device 400 that can effectively integrate several types of application data. In one embodiment the communication device 400 could be a radio subscriber unit (e.g., radio subscriber unit 102), but in other embodiments it could be some other communication device. The communication device 400 includes a digital baseband integrated circuit (IC) 401 that is coupled to a radio frequency circuit 445 via a common digital interface 437. The communication device 400 comprises an application processor 403 coupled to a multimode SDR modem 405 via a interface 407 that comprises pin connections for clocking, pulse code modulated signals, audio via I2C connect pins, other control pins, and IPC-SPI pins, for example. In addition, the SDR modem may be coupled to a memory 413, such as a NOR Flash, or PSRAM with an MCAP or modularly configured attached for processor. The application processor 403 may also comprise a non-volatile memory 409 and/or a volatile memory 411, such as a NAND flash memory 409 and/or a DDR SDRAM memory 411, for example.

In one embodiment, the application processor 403 is coupled to an application power management unit (PMU) 417. A modem PMU 419 is coupled to the multimode SDR modem 405 via a common interface 420. The common interface 420 may be a digital interface that is for a third set of application data standards of a lower data rate speed than any other set allocated to the common digital interfaces 437 and 423. For example, the interface 420 is a low data rate device/interface that may be a typical audio interface or any other low data rate interface for providing data rate standards of lower speed than any other interface 437 and 423. For example, the interface 420 may be partitioned for low data rate standards such as Bluetooth or FM radio. The modem PMU 419 can also serve as be a microcontroller that governs power functions for the communication device 400 with FM RF 427 and Bluetooth RF 425 coupled to the same interface 420.

In one embodiment of the disclosure the radio frequency (RF) circuit 445 can be allocated to a cellular section for a cellular RF engine 439 that can also include a diversity receiver as an optional component coupled to it and provided to the baseband 401 via the common digital interface 437. The common digital interface 423 is coupled to the connectivity section 421 comprising several different receivers (e.g., a connectivity RF engine 429), each of which may be used to communicate a different type of application data. The data standards can be any type of standard that can be partitioned for receiving for the particular RF circuit to be received at the baseband processor 401 via the common digital interface 423 or 437. For example, the present disclosure embodies a partitioning according to those standards within a similar data rate speed. For example, the common digital interface 437 could be used to receive cellular data for the operation of a cellular engine 439 coupled to a front end module or PA FEM 441.

A control signal (which could control a switching element, such as a multiplexor, switch, etc.) could be based on whether data has been received at the first or second receiver (not shown) providing data through to the common digital interface, such as 423. If one type of application data is received exclusively at one receiver, the selected data could be one of the first set of data standards. By contrast, if data is received exclusively at another receiver, the selected data could be compliant with a second of the first set of data standards. Any number of sets of data standards may be embodied and received according to a number of various means/criteria. For example, if data is received at both the first and second receivers, the selected data could be based on a priority assigned to the first and second receivers. This priority can be based, for example, on the bandwidths associated with the first and second application data, quality of service (QoS) requirements for the first and second application data, or other considerations.

Any number of sets of application data could be embodied. For example, sets of application data can be classified according to a number of various means. A set of application data in one embodiment comprises a set of data types or data standards that are similar to one another by data rate speed. As one example, a first set of application data provided to the Baseband via the common digital interface 423 can comprise high data rate speeds through various receivers, wherein the high data rate speeds are of a higher data rate than any other set of standards of a plurality of different data standards. By way of another example, a second set of application data can comprise data rate standards that neither have high data rates or low data rates, but instead comprise a medium data rate standard, such as cellular data or diversity data for the cellular engine 439, for example via the common digital interface 437. In a further example, a third set of application data may comprise standards of low data rate speeds, such as Bluetooth or FM audio, or other low data rate standards that are lower than any of the other sets of data standards provided by the common interface 420.

In addition to or in substitution of one or more of the illustrated components, the illustrated communication system and other systems include suitable circuitry, state machines, firmware, software, logic, etc. to perform the various methods and functions illustrated and described herein, including but not limited to the methods described below (e.g. method 500 of FIG. 5). While the method 500 and other methods are illustrated and described as a series of acts or events, it will be appreciated that the present disclosure is not limited by the illustrated ordering of such acts or events. For example, some acts may occur in different orders and/or concurrently with other acts or events apart from those illustrated and/or described herein. In addition, not all illustrated actions may be required to implement a methodology in accordance with the disclosure.

Figure 5:
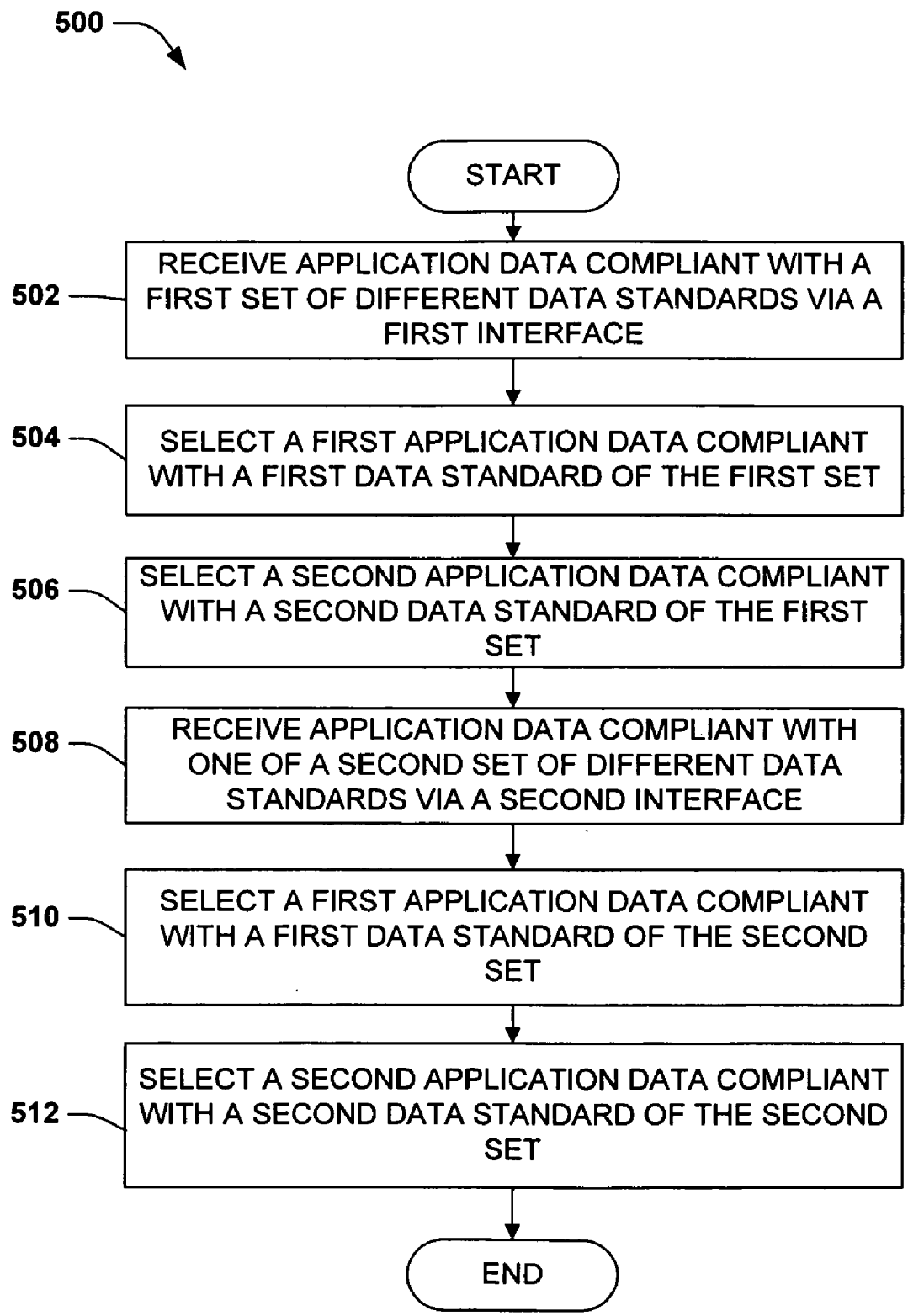
FIG. 5 is a flow chart of one method for communicating with a baseband integrated circuit over multiple digital interfaces that are partitioned.

FIG. 5 illustrates a method 500 for communicating with a digital baseband processor over a plurality of digital interfaces, comprising receiving 502 application data compliant with one of a first set of data standards on a digital baseband processor coupled to an SDR modem via a first common digital interface. The method 500 further comprises selecting 504 a first application data compliant with a first data standard of the first set of data standards and presenting at a first time the first application data compliant with the first set of data standards to the digital baseband processor over receive data pins of the first common digital interface, and selecting at block 506 a second application data compliant with a second data standard of the first set and presenting at a second time the second application data to the digital baseband processor over the receive data pins of the first common interface. The method 500 further comprises receiving 508 application data compliant with one of a second set of different data standards on a digital baseband processor coupled to a SDR modem via a second common digital interface, selecting 510 a first application data compliant with a first data standard of the second set and presenting the first application data compliant with the second set to the digital baseband processor over receive data pins of the second common digital interface, and selecting 512 a second application data compliant with a second data standard of the second set and presenting at a second time the second application data to the digital baseband processor over the receive data pins of the second common digital interface. Each data standard of the first set of different data standards is a faster data rate than the second set of different data standards and the first common digital interface provides data rate signals that are faster than the second common digital interface.

Although diverse embodiments are shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature of embodiments may have been disclosed with respect to only one of several aspects of one embodiment, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." To the extent the term "communicate" or derivatives thereof are used, such term is intended to encompass numerous scenarios, including but not limited to: only transmitting a signal to at least one component, only receiving a signal from at least one component, or transmitting signals to at least one component and receiving signals from at least one component.

What is claimed is:

1. A wireless device for communicating a digital baseband signal, comprising:
 a digital baseband processor coupled to a modem; and
 a plurality of digital interfaces partitioned to receive one of a plurality of signals respectively associated with one of a plurality of data standards comprising:
  a first interface circuit configured to provide at least one application data that is compliant with one of a first set of data standards, and coupled to the modem via a first common digital interface; and
  a second interface circuit configured to provide at least one application data compliant with one of a second set of data standards coupled to the modem via a second common digital interface;
 wherein the second set of data standards or the first set of data standards comprises a plurality of different data standards; and
 wherein the first interface circuit or the second interface circuit having the plurality of different data standards plurality comprises a frame buffer configured to selectively receive at least one application data of the first set of data standards or the second set of data standards, respectively, depending on a control signal, and to transmit the at least one application data selectively received to the digital baseband processor via the first common digital interface or the second common digital interface, respectively, via the modem.

2. The wireless device of claim 1, further comprising a third interface circuit configured to provide at least one application data compliant with one of a third set of data standards to the frame buffer coupled to the modem via a third common interface.

3. The wireless device of claim 2, wherein the third set of data standards comprises data standards that have a lower data rate than both the first set of data standards and the second set of data standards.

4. The wireless device of claim 2, wherein the third interface circuit comprises a power management unit device having a frame buffer, and wherein the frame buffer comprises at least one FIFO associated with the at least one application data compliant with one of the third set of data standards and is configured to manage the at least one FIFO to send packets of data over the third common interface to the modem.

5. The wireless device of claim 2, wherein the third set of data standards comprises Bluetooth and FM radio standards, and the third common interface is an audio interface.

6. The wireless device of claim 1, wherein at least one frame buffer comprises at least one FIFO associated with the at least one application data compliant with one of the first set of data standards or one of the second set of data standards, respectively, and is configured to manage the at least one FIFO to send packets of data over the first common digital interface or second common digital interface, respectively, to the modem.

7. The wireless device of claim 1, wherein the second common digital interface is a Dig RF3.9G interface configured to provide at least one application data compliant with a second set of data standards that have a lesser data rate speed than the first set of data standards.

8. The wireless device of claim 1, wherein the second interface circuit comprises a cellular engine with a diversity receiver circuit and is configured to analyze signals from several independent fading paths, and to communicate global position system (GPS) data.

9. The wireless device of claim 1, wherein the first set of data standards comprises data standards that have a higher data rate than the second set of data standards.

10. The wireless device of claim 1, wherein the first set of data standards comprises WLAN, WiMaxx, LTE, DVB and/or a GPS data standards.

11. The wireless device of claim 1, wherein the first interface circuit is configured for a high speed connectivity engine, and wherein the first common digital interface comprises a Dig RF4G interface or any other real digital high speed interface capable of receiving the at least one application data compliant with one of the first set of data standards, and wherein the first set of data standards comprises data standards that have a higher data rate than the second set of data standards.

12. The wireless device of claim 1, wherein the modem is a multi-mode software-defined radio (SDR) modem.

13. A communication device, comprising:
 a first data rate device coupled to a first digital interface comprising receive pins and transmit pins, configured to receive an application data that is compliant with a first set of data standards and to selectively provide the application data that is compliant with a first data standard of the first set of data standards to the receive pins, and at a different time selectively provide the application data that is compliant with a second data standard of the first set of data standards to the receive pins;
 a second data rate device coupled to a second digital interface comprising receive pins and transmit pins, configured to receive an application data that is compliant with a second set of data standards and to selectively provide the application data that is compliant with a first data standard of the second set of data standards to the receive pins, and at another given time selectively provide the application data that is compliant with a second data standard of the second set of data standards to the receive pins;
 a third data rate device coupled to a third digital interface and configured to receive an application data that is compliant with a third set of data standards and at a given time selectively provide the application data that is compliant with a first data standard of the third set of data standards to the receive pins, and at another given time selectively provide the application data that is compliant with a second data standard of the third set of data standards to the receive pins; and
 a software defined radio (SDR) modem coupled to a digital baseband processor, to the first digital interface, to the second digital interface, and to the third digital interface;
 wherein the digital baseband processor comprises transmit data pins for transmitting application data and receive pins for receiving application data via the SDR modem; and
 wherein the second set of data standards or the first set of data standards comprises a plurality of different data standards.

14. The communication device of claim 13, wherein the first set of data standards comprises global positioning system data, WLAN, WiMaxx, LTE, and DVB data standards, and the second set of data standards comprises cellular data and diversity data standards from a diversity receiver, and the third set of data standards comprises Bluetooth data and FM radio data.

15. The communication device of claim 13, comprising:
 a frame buffer configured to selectively receive the first set of data standards or the second set of data standards based on a control signal, and to transmit data selectively received data to the digital baseband processor via the receive pins.

16. The communication device of claim 13, wherein the first digital interface receives signals from data standards that are faster than data standards of the second digital interface, and the second digital interface receives signals of data standards that are faster than the third digital interface.

17. The communication device of claim 13, wherein the first digital interface is a DigRF4G interface or any other real digital high speed interface and the second digital interface is a DigRF3.9G interface.

18. The communication device of claim 13, wherein the first data rate device receives data of a data standard that is a faster data rate than the second data rate device and the second data rate device receives data that is a data standard of a faster rate than the third data rate device.

19. The communication device of claim 13, wherein the first set of data standards comprises WiMaxx, LTE and DVB data standards, the second set of data standards comprises cellular data, and the third set of data standards comprise data standards that have a lower speed rate than the first set of data standards and than the second set of data standards and is configured as a power management unit device.

20. A method for communicating with a digital baseband processor over a plurality of digital interfaces, comprising:
   receiving application data that is compliant with one of a first set of data standards on a digital baseband processor coupled to an "software-defined radio (SDR) modem" by a first common digital interface comprising receive pins and transmit pins;
   selecting a first application data that is compliant with a data standard of the first set of data standards and transmitting at a first time the first application data that is compliant with the first set of data standards to the digital baseband processor over receive pins and transmit pins of the first common digital interface;
   selecting a second application data that is compliant with a second data standard of the first set of data standards and transmitting at a second time the second application data to the digital baseband processor over the receive pins of the first common digital interface;
   receiving application data that is compliant with one of a second set of data standards on the digital baseband processor coupled to the SDR modem via a second common digital interface;
   selecting a first application data that is compliant with a first data standard of the second set of data standards and presenting the first application data that is compliant with the second set of data standards to the digital baseband processor over receive pins of the second common digital interface; and
   selecting a second application data that is compliant with a second data standard of the second set of data standards and presenting the second application data to the digital baseband processor over the receive pins of the second common digital interface;
   wherein each data standard of the first set of data standards comprises a faster data rate than the second set of data standards and the first common digital interface is compliant with data standards that are faster than that of the second common digital interface.

* * * * *